Jan. 5, 1932.  W. B. HILL  1,839,759
GLASS CUTTING MACHINE
Filed May 22, 1929  3 Sheets-Sheet 2
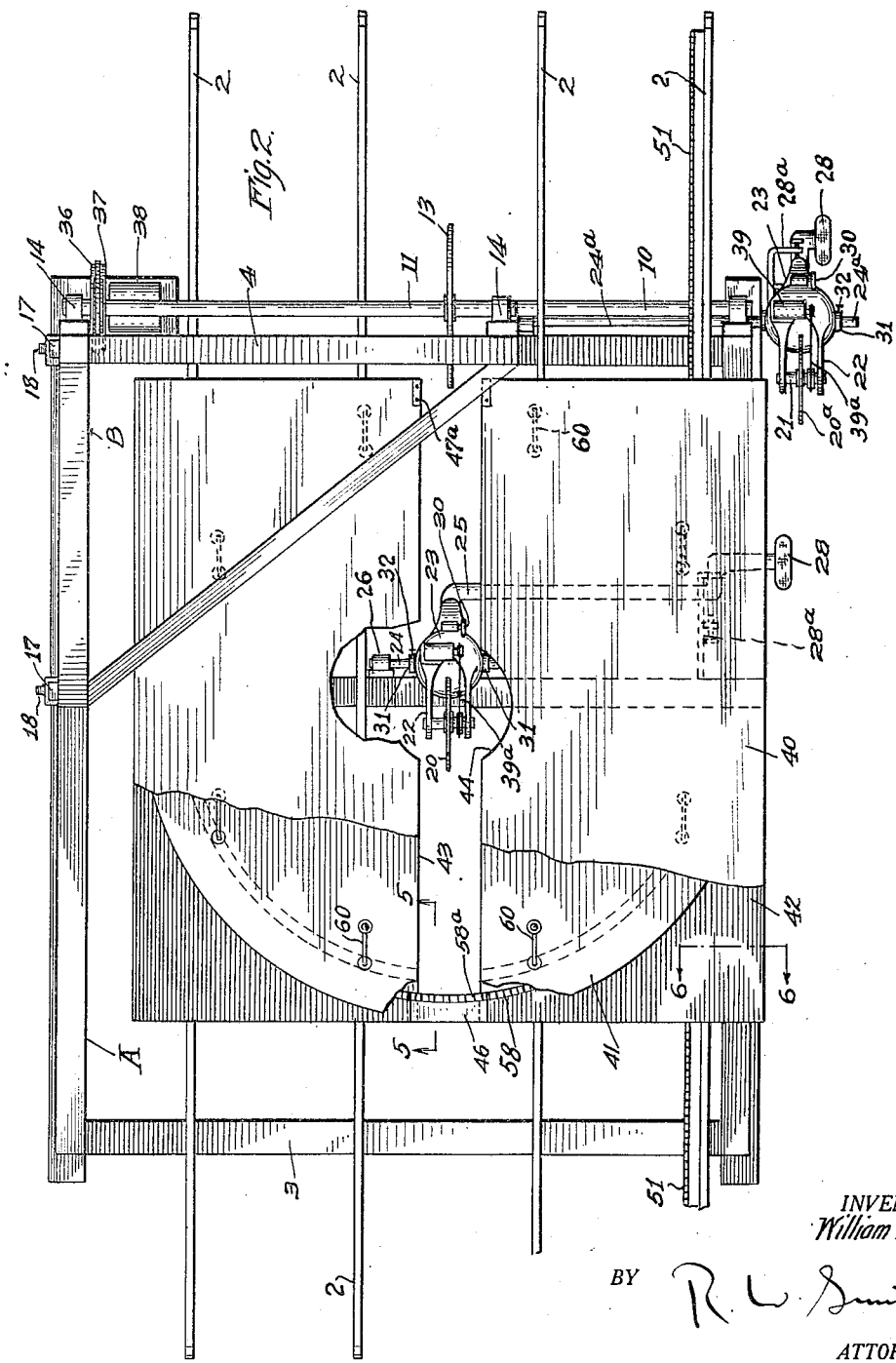
INVENTOR.
*William B. Hill,*
BY
ATTORNEY.

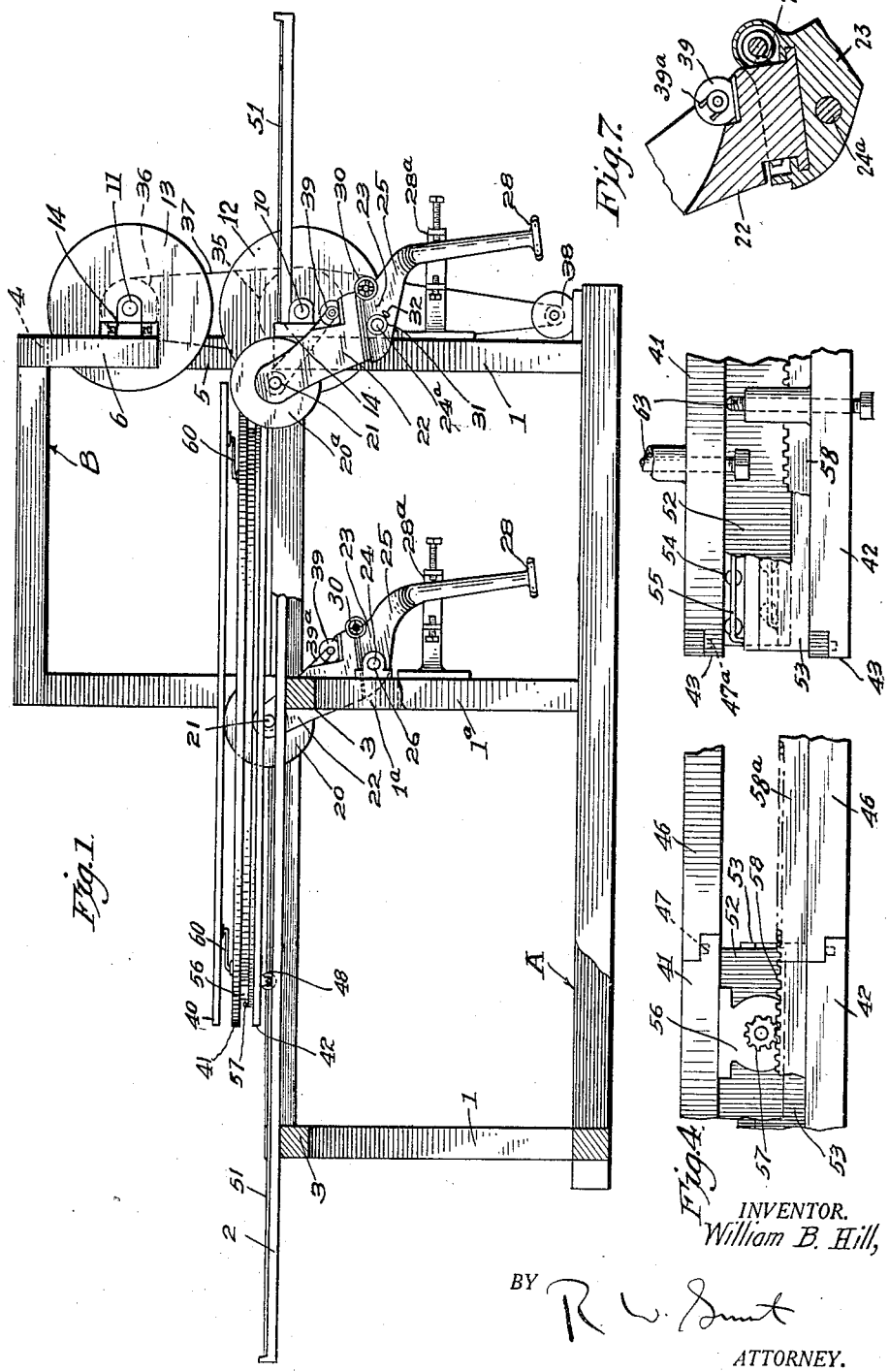

Jan. 5, 1932.   W. B. HILL   1,839,759
GLASS CUTTING MACHINE
Filed May 22, 1929   3 Sheets-Sheet 3
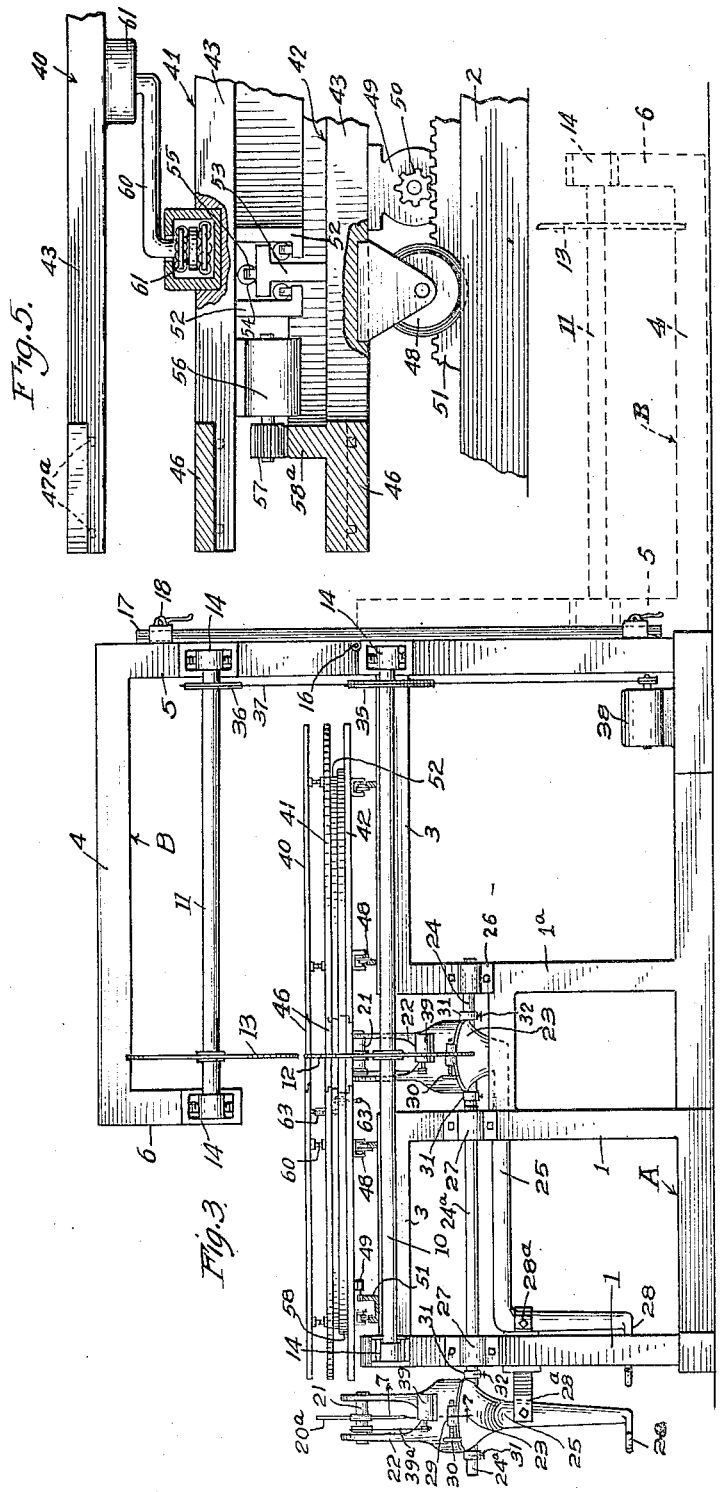
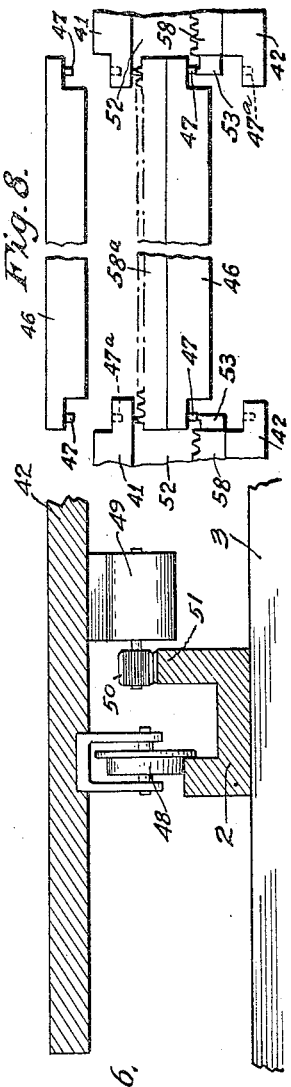
INVENTOR.
William B. Hill,
BY R. L. Smmt
ATTORNEY.

Patented Jan. 5, 1932

1,839,759

UNITED STATES PATENT OFFICE

WILLIAM BURD HILL, OF LOS ANGELES, CALIFORNIA

GLASS CUTTING MACHINE

Application filed May 22, 1929. Serial No. 365,062.

This invention is a machine for cutting glass, and has for its object to provide a support for the glass arranged for a plurality of movements whereby selective shifting of the support with relation to a cutter element will provide a wide range of variation in the contour of the resulting cut without the necessity of changing the position of the glass on the support.

It is a further object of the invention to adapt the support for both independent and simultaneous curved and straight line movement so that various combinations of curved and straight line cuts may be made without shifting the glass with relation to its support.

It is a still further object of the invention to selectively adapt the machine for either completely cutting through a sheet of glass by simultaneous alined cuts in its opposite surfaces, or for simply cutting a design to any desired depth in one surface of the glass.

It is a still further object of the invention to adapt the support for mounting of a cutter element beneath the support so that the cutter element will cut an ornamental design in the under surface of a sheet of glass resting on the support, thereby positioning the cutter element where it will be out of the way of the operator and thus providing for convenient shifting of the support so as to produce a cut of variable contour.

Further objects of the invention will be readily understood from the following description of the accompanying drawings, in which:

Fig. 1 is a side elevation of the invention, partly in vertical section.

Fig. 2 is a plan view of the inventon with the glass support partly broken away.

Fig. 3 is an end elevation of the invention.

Fig. 4 is a fragmentary end elevation of the glass support, partly broken away.

Fig. 5 is a detail section on the line 5—5 of Fig. 2.

Fig. 6 is a detail section on the line 6—6 of Fig. 2.

Fig. 7 is a detail vertical section on the line 7—7 of Fig. 3.

Fig. 8 is a fragmentary view similar to Fig. 4 but showing the cross bars for the split tables elevated and ready for removal.

The machine comprises cutter discs mounted in a main frame and a support for the glass movably mounted in the main frame for variable shifting with relation to the cutter discs, so that the glass mounted on the support may be brought into engagement with the cutter discs for making a cut of variable contour as a result of predetermined shifting of the glass support and without changing the position of the glass thereon.

The main frame is preferably an elongated rectangular structure A including end uprights 1 terminating at approximately the level of transversely spaced longitudinal tracks 2 which are supported on cross beams 3 of the main frame and preferably project appreciably beyond the respective ends of said frame. A displaceable superstructure B is preferably hinged to one side of the main frame adjacent its rear end so that when in operative position as shown in Fig. 3 a horizontal beam 4 is vertically spaced above the main frame and extends part way across the same in vertical alinement with its rear end, with an upright 5 depending from one end of said horizontal beam and adapted for vertically alined support on one of the end uprights 1 of the main frame, and an upright 6 depending from the opposite end of the beam 4 and terminating in appreciably spaced relation above the tracks 2.

A shaft 10 extends across the rear end of the main frame A just below the tracks 2 and is journaled in suitable bearings on the end uprights 1, and a parallel and vertically alined shaft 11 extends across the rear end of superstructure B and is similarly journaled in bearings mounted on the uprights 5—6. Cooperating glass cutting discs 12—13 are fixed on the shafts 10—11 medially of the width of frame A, and the bearings for said shafts which are shown at 14 are preferably vertically adjustable in order to adjust the vertical spacing between the cooperating cutter discs so that a sheet of glass of any predetermined thickness when moved through the space between the discs must be cut into at its respective surfaces to a depth providing a complete severing cut.

When a sheet of glass is to be cut at only one surface so as to provide merely an ornamental instead of a complete severing cut, the cutter disc 13 is not employed, and may be moved out of the way by swinging the superstructure B to the dotted line position shown in Fig. 3, the uprights of said superstructure being hinged to the main frame A as shown at 16 in Fig. 3 to permit said swinging movement; and the superstructure is preferably readily releasably secured in its operative position by locking bars 17 which may be clamped in place as shown at 18 so as to lock and brace the superstructure. The cutter disc 12 may then be employed for cutting an ornamental design in the under surface of the glass without severing the glass, and additional cutter discs 20—20$^a$ are preferably mounted in the main frame A so as to provide optional design cuts in the under surface of the glass.

The cutter discs 12, 20 and 20$^a$ which are adapted to cut ornamental designs in the under surface of the glass, are mounted below the glass support and are thus out of the way of the operator shifting the glass support relative to said cutter discs. Each of the additional cutter discs 20—20$^a$ is preferably mounted on a horizontal shaft 21 journaled in a yoke 22 which is rotatable on a substantially vertical axis with relation to a supporting head 23, and the supporting head is preferably fulcrumed on a horizontal axis, with a lever 25 projecting from the supporting head for rocking the same on its horizontal axis.

A shaft 24 forms the horizontal axis for the supporting head of disc 20 and is preferably supported in bearings 26 which may be mounted on medial uprights 1$^a$ of frame A so that the shaft extends transversely of the main frame below tracks 2, with the disc 20 positioned substantially medially of both the width and length of frame A and adapted to be raised and lowered between the transversely spaced tracks 2; and a shaft 24$^a$ forms the horizontal axis for the supporting head of disc 20$^a$ and is preferably supported in bearings 27 (Fig. 3) mounted on the uprights 1 at the rear end of frame A so that the shaft projects laterally beyond the main frame below tracks 2 and at the side of said main frame opposite the hinged mounting for superstructure B, with the mounting for disc 20$^a$ supported on the projecting end of shaft 24$^a$ in order to space the disc 20$^a$ outwardly beyond the main frame A as shown in Figs. 2 and 3.

The levers 25 for rocking the supporting heads 23 so as to raise and lower the cutter discs 20—20$^a$, preferably depend from said supporting heads and then extend transversely of the main frame as shown in Fig. 2 so as to terminate in foot pedals 28 adapted for convenient engagement by the operator standing at the side of the machine which is opposite the hinged mounting for superstructure B, and the rocking levers may be preferably held at any desired adjustment by set screws 28$^a$. As shown in detail in Fig. 7 the yokes 22 for the cutter discs may be rotated with relation to supporting heads 23 so as to adjust the cutter discs on substantially vertical axes, by worm gear operating means 29 which have manually actuated controls 30. The supporting heads 23 may be laterally shifted along their shafts 24—24$^a$ for adjusting the lateral positioning of cutter discs 20—20$^a$, and for this purpose the supporting heads are preferably mounted between thrust collars 31 which may be fixed in adjusted position along the shafts by set screws 32.

The various cutter discs 12, 13, 20 and 20$^a$ are preferably motor driven, and for this purpose pulleys 35—36 on shafts 10—11 may have a belt drive 37 from a motor 38; and a motor 39 is mounted on each of the yokes 22 which support cutter discs 20—20$^a$, with a belt drive 39$^a$ between each of said motors and the corresponding cutter disc. When the superstructure B is swung to inoperative position so that cutter disc 13 is not in use, as shown in dotted lines in Fig. 3, the driving belt 37 for the cutter discs 12—13 is of course replaced by a belt (not shown) which is adapted to engage only the pulley 35 of the shaft 10.

The movable support which shifts the glass for cutting engagement by either the cooperating discs 12—13 for cutting the glass in two, or for merely an ornamental cut in the under surface of the glass by one of the cutter discs 12, 20 or 20$^a$ when cutter disc 13 has been removed, is mounted on tracks 2 so as to permit movement of the support in various directions with relation to the one or more cutters which are in use, in order that a cut of variable contour may be made by predetermined movement of the support with relation to said cutter and without changing the position of the glass on the support.

For this purpose the support is shown as comprising a plurality of superimposed tables, in the present instance three in number and shown at 40, 41 and 42, with the glass adapted for support upon the upper table 40 which is adapted for either longitudinal, transverse or rotary adjustment, or any combination of said adjustments, with relation to the one or more cutter discs which are in use. The table 40 which supports the glass is at a level whereby the glass is adapted to pass between the cutters 12—13 for cutting the glass in two, and during said operation the cutters 20—20$^a$ may be depressed by rocking their supporting yokes on shafts 24—24$^a$ so that said cutters are in inoperative spaced relation below the glass supporting table 40, or if a design is to be simply cut into the face of the glass without severing the same, the cutter 13 is swung to inoperative position as previously described, and either the cutter disc 12 is employed for cutting an ornamental design in the under surface of the glass, or said cutter disc is depressed by adjusting the bearings 14 for its shaft 10 so that said cutter disc is in inoperative position below and clear the glass, and one or the other of cutter discs 20—20ª is then vertically adjusted with relation to table 40 so as to cut an ornamental design in the under surface of the glass.

In order that the tables may clear the one or more cutter discs which are in use, the side edges of the tables are laterally spaced from the cutter disc 20ª and the tables are longitudinally split as shown at 43 (Fig. 2), so that with the tables relatively fixed and their splits 43 in vertical alinement and parallel to tracks 2 as shown in Fig. 2, the tables may be moved as a unit along the tracks and past the one or more cutter discs which are in use, with the glass straddling the splits 43 or overhanging the edges of the tables for engagement by said one or more cutters.

As shown in Fig. 2 the splits 43 are of appreciable width and the cutter disc 20ª is so spaced beyond the side edges of the tables as to permit substantial lateral adjustment of table 40 with relation to tables 41—42 and still clear the moving tables of the one or more cutter discs which are in use; and medially of their length the splits 43 are preferably circumferentially enlarged as shown at 44 (Fig. 2), so as to permit rotation of tables 40—41 approximately concentric with cutter disc 20, or permit adjustment of said cutter disc with relation to the tables by rotating its yoke 22 on its supporting head 23, and still allow movement of the tables clear of said cutter disc.

The two parts of each of the split tables are preferably releasably connected so that each of the tables may be moved as a unit, and for this purpose cross bars 46 are adapted to extend across the respective ends of splits 43 and are readily releasably secured to the two sections of each table by means of pins 47 engaging cooperating recesses 47ª as shown in Figs. 4 and 8. As the tables are moved toward the one or more cutters which are in use, say for example the cooperating cutters 12—13, the cross bars 46 at the forward ends of the splits 43 in the respective tables are removed as shown at the right of Fig. 2, so as to permit the cutters to enter the splits, with the cross bars at the rear ends of the splits remaining in place, said cross bar of table 42 being shown at the left of Fig. 2, thereby maintaining unitary structures of the respective tables; and when the tables have been so moved that the forward ends of splits 43 are beyond the cutters the forward cross bars 46 are replaced and thus maintain unitary structures of the tables when the rear cross bars are removed for exit of the cutters from the splits.

The shifting of table 40 in any direction so as to produce cuts of varying contour, is obtained by adapting table 42 for longitudinal movement along tracks 2, with table 41 adapted for rotation on table 42, and the glass supporting table 40 adapted for both lateral and longitudinal shifting with relation to table 41. As an instance of this arrangement a pair of tracks 2 is provided for each of the two parts of the table 42 as shown in Figs. 2 and 3, and flanged wheels 48 depending from each of the two parts of table 42 engage the cooperating tracks. The table 42 may be moved along the tracks by hand or power mechanism, and for this purpose a motor 49 may be mounted on the underside of the table as shown in detail in Fig. 6, with a cog 50 on the motor shaft engaging a rack 51 which extends along one of the tracks 2.

Rotation of table 41 on the table 42 is preferably guided by a turn-table mechanism shown in detail in Figs. 4 and 5 and including interlocking parts 52—53 which depend from table 41 and project upwardly from table 42 respectively, with said interlocking parts terminating at the splits 43 which separate the two parts of the respective tables as shown in Figs. 4 and 8; and anti-friction means shown as ball bearings 54 (Figs. 4 and 5) are preferably interposed between the interlocking parts of the turn-table and are held in place by usual ball races 55 so as to prevent displacement of the ball bearings where said anti-friction means terminate at the splits 43 as shown at the right of Fig. 4. The table 41 may be rotated by hand or by power mechanism, and for this purpose a motor 56 (Figs. 4 and 5) which depends from table 41 may have a cog 57 on its drive shaft adapted to mesh with a circular rack 58 on the table 42, with the rack continued across the split 43 in table 42 as shown at 58ª in Figs. 4 and 5, preferably on the cross bars 46 which are adapted to bridge the respective ends of the split.

The lateral and longitudinal shifting of table 40 with relation to table 41 is preferably by means of crank arms 60 pivoted at their respective ends to the underside of table 40 and to the top of table 41 with the axes of said pivots perpendicular to the plane of table 40 as shown in Fig. 5. A plurality of said crank arms are preferably provided for each of the two parts of the split tables 40—41 as shown in Fig. 2, and the pivotal connections between the crank arms and the tables preferably having usual anti-friction bearings 61 as shown in Fig. 5.

The various tables may be locked in any desired adjusted position, as for example by set screws 63 (Fig. 4), or any one or more of said tables may be released for separate shifting of one of said tables or dependent shifting of a plurality of said tables, either by hand or power, so as to provide variable movement of table 40 with relation to the one or more cutter discs which are in use, in order that a cut of varying contour may be made in the glass which is supported on table 40.

As previously described the cutters 12—13 may cooperate for cutting a sheet of glass in two, or cutter 13 may be swung out of the way, and cutter 12, 20 or 20$^a$ may be employed for cutting an ornamental design in the under surface of the glass, with either the severing cut or the ornamental cut having a variable contour as a result of relative movement of the superimposed tables with relation to the one or more cutter discs which are in use, and without moving the glass on its supporting table 40. The various manipulations will be readily apparent to a skilled operator, it being noted generally that a straight severing cut will be made by locking the tables against relative movement and then moving the unitary table structure along tracks 2 for passage of the glass between cutters 12—13; and that a slightly curving severing cut may be produced by locking table 41—42 against relative movement and gradually laterally shifting table 40 with relation thereto as the entire table structure is moved along tracks 2 for passage of the glass between the cooperating cutters 12—13.

An ornamental design may be cut to a limited depth in the under surface of the glass by either cutter 12, 20 or 20$^a$ when cutter disc 13 has been moved out of the way as previously described, it being understood that whichever of said cutter discs is to be used is vertically adjusted so as to cut the desired depth in the under surface of the glass without cutting completely through the glass, and at the same time the other of said cutter discs which are not in use are depressed so as to lie clear of the glass in inoperative position.

The cutter disc 20$^a$ is particularly adapted to make an ornamental straight line cut of limited depth along the margin of a mirror or the like, by locking the tables against relative movement and then moving the unitary table structure along tracks 2 so that the cutter 20$^a$, with its yokes 22 rotatably adjusted and fixed relative to its head 23, will cut to the desired limited depth into the marginal portion of the glass which overhangs the edge of the table structure. If it is desired to continue the straight marginal cut as a semi-circular line, say for example around the usual semi-circular upper end of a mirror, the table structure is locked against further movement along tracks 2 when the straight cut has been completed and the table structure has been moved to a position where cutter 20$^a$ is tangential to the rotary table 41, and table 41 with table 40 locked relative thereto, is then rotated with relation to table 42 so as to continue the cut as a semi-circular line. When the semi-circle is completed table 41 is again locked against rotation, and the unitary table structure may then be retracted along tracks 2 for completing the straight marginal cut along the opposite side of the mirror.

Either the cutter 12 or 20 is employed for cutting ornamental designs to a limited depth in the under surface of the glass, scrolls and flower work for example, the various lines being cut by suitably shifting the table 40 with relation to table 41 so as to provide the desired adjustment of the glass with relation to the cutter without moving the glass on table 40, and the entire table structure being then moved along tracks 2 so as to engage the glass by the cutter. In similar manner the cutter 20$^a$ may be employed for cutting an ornamental design in the marginal portion of the under surface of glass, it being understood that the cutters 20—20$^a$ when thus used for cutting an ornamental design, are controlled by foot pedals 28 for interrupting the operation of the cutters to permit necessary readjustment of the glass with relation thereto. By adjusting the set screws 28$^a$ the ornamental cuts made by the discs 20—20$^a$ may be limited to a predetermined depth, and by adjusting the bearings 14 of shaft 10 the ornamental cuts made by cutter 12 may be similarly limited in depth.

If the ornamental cuts are to be simply narrow, sharply defined cuts, the yokes 22 of cutters 20—20$^a$ are fixed in rotatably adjusted position on their supporting heads 23 so that the glass supporting table 40 is adapted for shifting in a direction parallel to the planes of the cutter discs; but if it is desired to make a cut having a bias scooping action such as will produce flower work, the yoke 22 of the cutter which is to be used is rotatably adjusted on its head 23 so that the cutter will engage the glass at an angle to the direction of movement of table 40 toward the cutter.

I claim:

1. In a glass cutting machine, a cutter disc, a support for a sheet of glass movable relative thereto, the cutter disc being mounted so as to engage the underside of the sheet of glass, and the support being split for passage of the cutter disc through said split as the support is moved with relation to the cutter disc, and means for bridging the respective ends of the split in the support, the said bridging means being removable independently of one another.

2. In a glass cutting machine, a cutter disc, and a support for a sheet of glass movable relative thereto, said support including a rotary table, a table overlying the rotary table, and a crank arm support for the overlying table pivoted at its respective ends to the rotary table and the overlying table with the axes of its pivots angularly disposed with relation to the plane of the overlying table.

3. In a glass cutting machine, a cutter disc, and a support for a sheet of glass movable relative thereto, said support including a table adapted for longitudinal movement relative to the cutter disc, a table adapted for rotation on said first table, a table overlying the rotary table, and a crank arm support for the overlying table pivoted at its respective ends to the rotary table and the overlying table with the axes of its pivots angularly disposed with relation to the plane of the overlying table.

4. In a glass cutting machine, a cutter disc, a table adapted to support a sheet of glass, a supporting medium beneath the table, said supporting medium being adapted for longitudinal movement relative to the cutter disc, and a crank arm support for the table pivoted at its respective ends to the supporting medium and the underside of the table with the axes of its pivots angularly disposed with relation to the plane of the table.

In testimony whereof I have affixed my signature.

WILLIAM BURD HILL.